(12) United States Patent
Serreze

(10) Patent No.: US 9,250,122 B2
(45) Date of Patent: Feb. 2, 2016

(54) SOLAR SIMULATOR

(75) Inventor: Harvey B. Serreze, Pepperell, MA (US)

(73) Assignee: Spire Corporation, Bedford, MA (US)

( * ) Notice: Subject to any disclaimer, the term of this patent is extended or adjusted under 35 U.S.C. 154(b) by 928 days.

(21) Appl. No.: 13/373,176

(22) Filed: Nov. 7, 2011

(65) Prior Publication Data
US 2013/0114237 A1  May 9, 2013

(51) Int. Cl.
*F21V 7/00* (2006.01)
*G01J 1/08* (2006.01)
*F21V 13/08* (2006.01)
*F21S 8/00* (2006.01)
F21V 9/04 (2006.01)
F21V 19/00 (2006.01)
F21Y 103/00 (2006.01)

(52) U.S. Cl.
CPC .. *G01J 1/08* (2013.01); *F21S 8/006* (2013.01); *F21V 13/08* (2013.01); *F21V 7/005* (2013.01); *F21V 9/04* (2013.01); *F21V 19/008* (2013.01); *F21Y 2103/00* (2013.01); *Y10T 29/49826* (2015.01)

(58) Field of Classification Search
USPC .............. 362/1, 2, 293, 217.02, 217.05, 237, 362/240, 242, 243, 247, 298, 307, 346; 250/503.1, 504 R
See application file for complete search history.

(56) References Cited

U.S. PATENT DOCUMENTS

| 3,247,367 A * | 4/1966 | Juan ............................... 362/241 |
| 3,517,201 A | 6/1970 | Gilford et al. |
| 4,125,775 A | 11/1978 | Chodak |
| 4,641,227 A | 2/1987 | Kusuhara |
| 5,623,149 A | 4/1997 | Kilmer |
| 5,676,446 A | 10/1997 | Gold |
| 5,984,484 A | 11/1999 | Kruer |
| 6,548,819 B1 | 4/2003 | Lovelady |
| 6,975,663 B2 | 12/2005 | Sekiya et al. |
| 7,255,457 B2 | 8/2007 | Ducharme et al. |
| 7,514,931 B1 | 4/2009 | Shimotomai et al. |
| 7,528,615 B2 | 5/2009 | Shimotomai |
| 8,052,291 B2 | 11/2011 | Serreze |
| 2002/0122305 A1 | 9/2002 | Adelhelm |
| 2008/0223441 A1 * | 9/2008 | Jungwirth ..................... 136/259 |
| 2008/0252831 A1 | 10/2008 | Lee et al. |
| 2008/0304261 A1 | 12/2008 | Van De Ven et al. |
| 2013/0003341 A1 * | 1/2013 | Kubo et al. ....................... 362/1 |

FOREIGN PATENT DOCUMENTS

TW    I 281045    5/2007

OTHER PUBLICATIONS

Written Opinion of the International Searching Authority for PCT Application No. PCT/US2010/00388, mailed Apr. 9, 2010, (four (4) pages).
U.S. Appl. No. 13/682,001, filed Nov. 20, 2012, Serreze et al.
Written Opinion of the International Searching Authority for PCT Application No. PCT/US2012/061466 mailed Jan. 8, 2013 (seven (7) pages).

* cited by examiner

*Primary Examiner* — Thomas M Sember
(74) *Attorney, Agent, or Firm* — Iandiorio Teska & Coleman, LLP

(57) ABSTRACT

A compact solar simulator includes a target surface for a solar module, an enclosure behind the target surface, and at least one source fixture including a lamp in the enclosure spaced from the target surface. Diffusing surfaces about the source fixture diffuse radiation emitted by the lamp. Specular reflectors are positioned to steer the diffused radiation to the target surface and are oriented to create a uniform intensity distribution across the target surface. Moreover, the surface area of any desired filters is reduced and any longitudinal non-uniform intensity distribution of the lamp is corrected.

34 Claims, 7 Drawing Sheets

SOLAR SIMULATOR

FIELD OF THE INVENTION

The subject invention relates to solar simulators.

BACKGROUND OF THE INVENTION

Solar simulators are used to test solar panel modules. A viable simulator must include a light source whose output matches the solar spectrum. Specular spatial, irradiance spatial, and temporal uniformity are also requirements.

An example of a compact solar simulator is the "Spi-Sun Simulator™ SLP" offered by the applicant hereof. Other solar simulators are discussed, for example, in U.S. Pat. Nos. 7,514,931 and 7,528,615 incorporated herein by this reference. Compact solar simulators typically have a lamp or lamps fairly close to the target surface as opposed to some distance away as is the case with projection simulators.

In the prior art, a mask was sometimes used to control the intensity distribution of light from the source at the target surface upon which the solar panel module rests or over which the solar panel module is positioned. In one example, the mask was placed on filter panels themselves residing on an acrylic surface between the source(s) and the target surface.

Creating a mask for each production unit, installing it, and testing it is a very time consuming and expensive procedure. Creating a mask can also be a procedure which is difficult to replicate. A mask can also noticeably reduce the overall intensity at the test plane requiring that additional energy be put into the source lamp(s).

BRIEF SUMMARY OF THE INVENTION

In one embodiment of the invention, masking is not needed thus reducing the cost of manufacturing a solar simulator and also increasing the overall intensity at the test plane. Another aspect of a preferred embodiment is a reduction in the number of expensive filter panels needed in a simulator. Still another aspect of the invention is a technique to render uniform the longitudinal intensity distribution of the fixture lamp in the simulator.

Featured is a solar simulator comprising a target surface for a solar module, an enclosure behind the target surface, and at least one source fixture (including a lamp) in the enclosure spaced from the target surface. Diffusing surfaces are located about the source fixture for diffusing radiation emitted by the lamp. Specular reflectors are positioned to steer the diffused radiation to the target surface and oriented to create a uniform intensity distribution across the target surface. In one version, the lamp includes a xenon tube and there are two spaced source fixtures.

One example of a diffusing surface is a fixture cover over the lamp between the lamp and the target surface. Other diffusing surfaces include a diffusing outwardly angled wall on each side of the source fixture positioned to reflect lamp radiation towards the target surface. An example of specular reflectors includes mirrors on each inside wall of the enclosure. In one design, each mirror is disposed at an angle (e.g., ±5°) with respect to its respective wall to create a uniform intensity distribution across the target surface.

The source fixture may include a chamber for the lamp with walls including filter material. The cover of the chamber typically includes a diffusing surface facing the lamp. One or more chamber walls may further include blocking portions positioned to address longitudinal non-uniform intensities of the lamp. The blocking portions typically include elements mirrored on the inside and diffuse on the outside.

In other designs, there may be filters in the enclosure between the target surface and the source fixture. Typically, the lamp is a tube longer than the distance between the tube and the target surface which differentiates one preferred aspect of the invention from a projection type simulator.

The simulator source fixture typically defines a source plane in the enclosure and the diffusing surfaces are positioned behind the source plane while, in contrast, the specular reflectors are between the source plane and the target surface.

One preferred solar simulator includes a target surface for a solar module, an enclosure behind the target surface, and at least one source fixture including a tube lamp in the enclosure spaced from the target surface. The source fixture typically includes a diffusing cover over the tube lamp. Also included is a diffusing outwardly angled wall on each side of and coextensive with or nearly coextensive with the source fixture and configured to reflect lamp radiation towards the target surface. Mirrors, preferably adjustable, on each inside wall of the enclosure are above the source fixture and are angled to create a uniform intensity distribution across the target surface.

The invention also features a method of manufacturing a solar simulator. A source fixture including a lamp is positioned near the floor of a simulator enclosure beneath its target surface. An outwardly angled diffusing wall is located on each side of the source fixture and configured to control the intensity distribution of radiation emitted by the source fixture at the target surface. Specular reflectors above the source fixture steer diffused radiation towards the target surface. The specular reflectors are adjusted to render uniform the intensity distribution of radiation emitted by the source lamp at the target surface.

The method may further include the step of adding filter elements between the lamp and the target surface and the filter elements can be fabricated as a part of the fixture. In other designs, the filter elements span the enclosure above the source fixture. The preferred method further includes selectively blocking radiation from the lamp to render uniform its intensity distribution.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
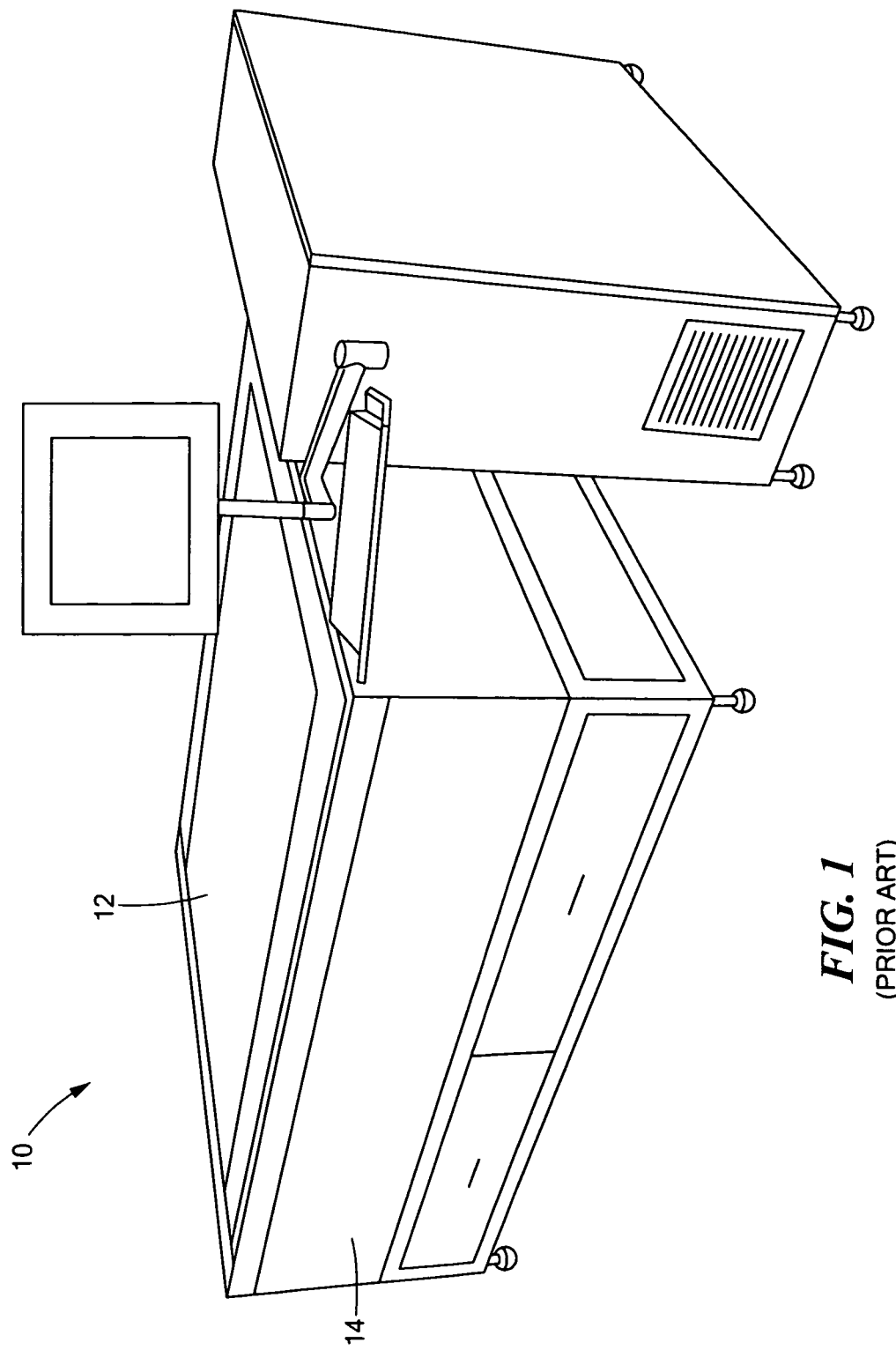
FIG. 1 is a schematic three dimensional front view of an example of a solar simulator in accordance with the prior art.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
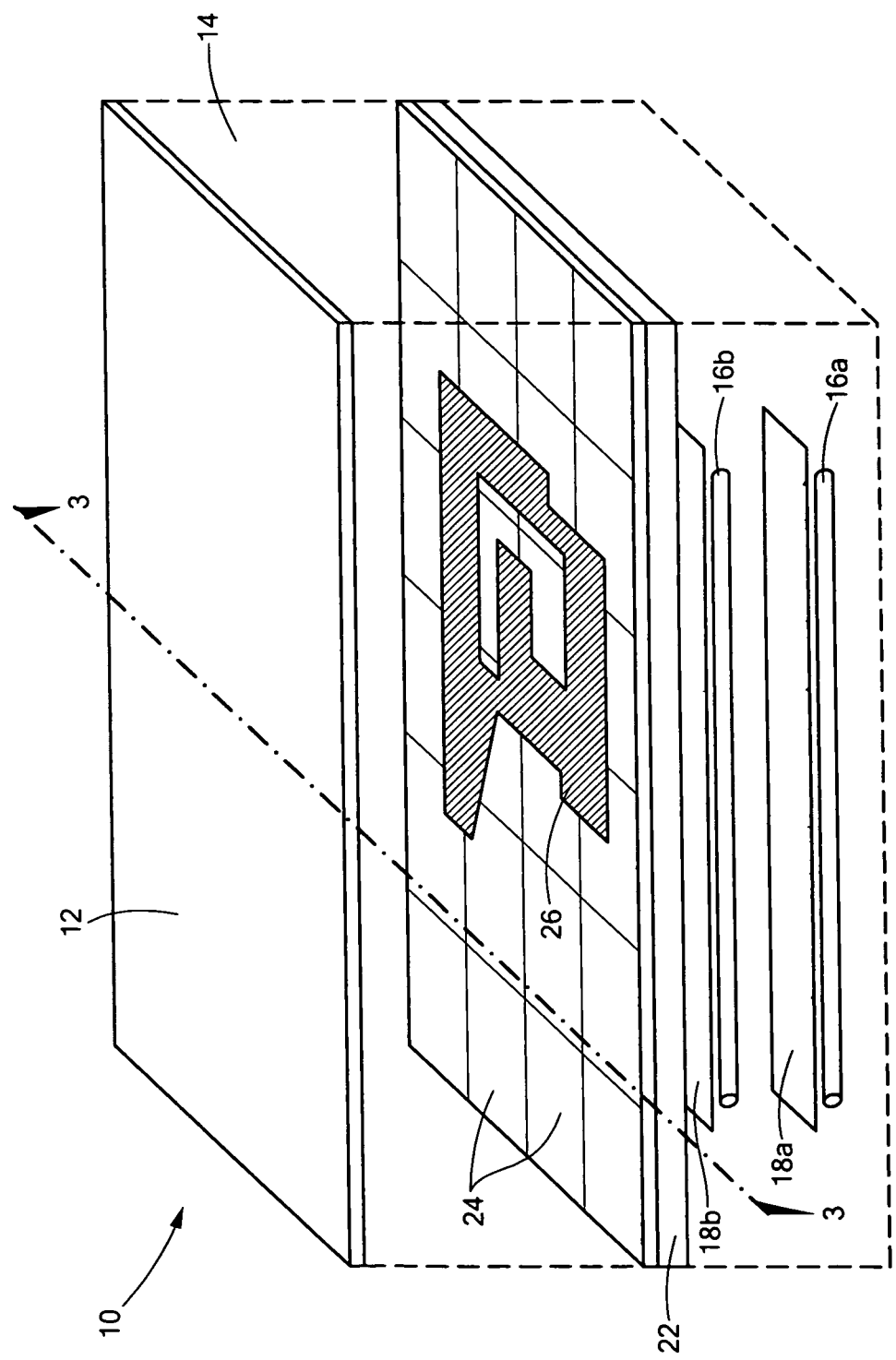
FIG. 2 is a highly schematic view showing the primary components inside the solar simulator enclosure of FIG. 1.
Figure 3:
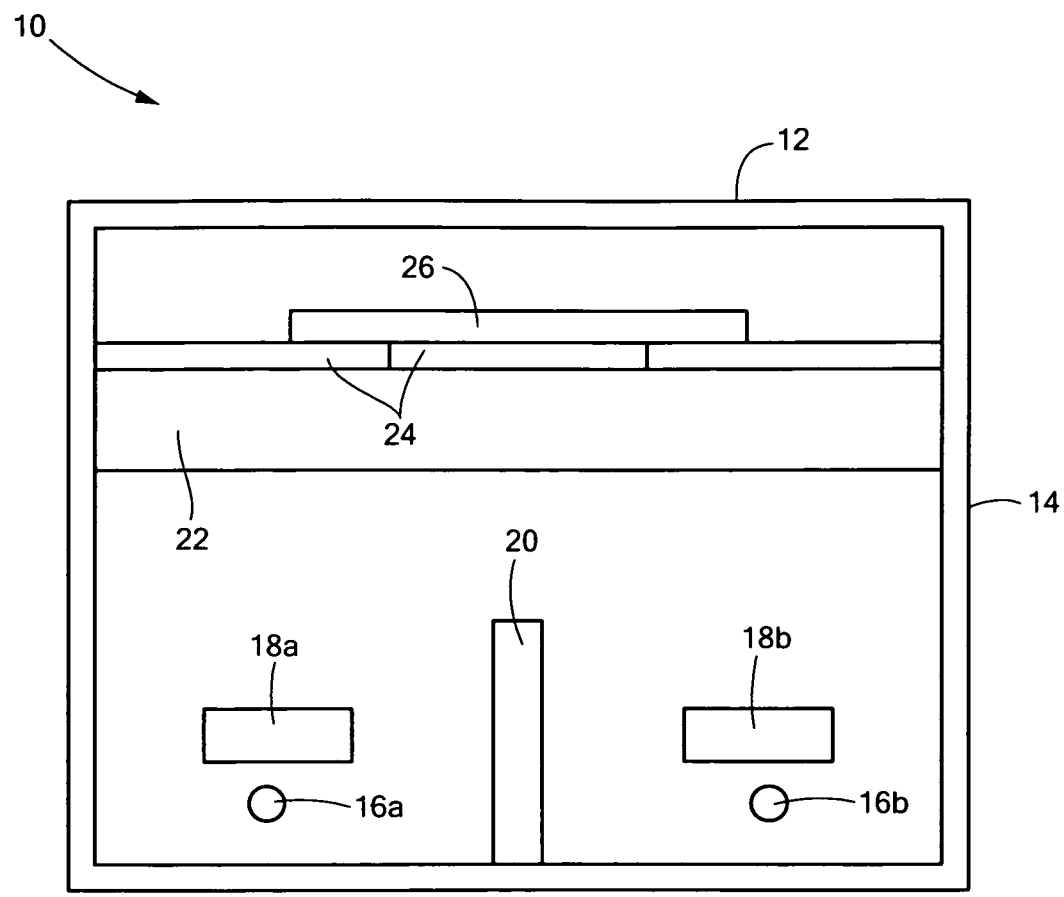
FIG. 3 is a schematic cross sectional view taken along lines 3-3 of FIG. 2.

FIG. 1 shows an example of an existing solar simulator 10 (e.g., a "Spi-Sun Simulator™ SLP") with target surface 12 defining a target plane supported by enclosure 14. Solar panels can be manually placed on target surface 12 or automatic options are available to bring solar panels into position above target surface 12. As shown in FIGS. 2-3, enclosure 14 typically houses two light fixtures each including a xenon tube 16a and 16b (single long pulse) and diffusing surfaces 18a and 18b, respectively. The fixtures are separated by diffusing wall 20. Acrylic panel 22 is above the fixtures and an array of infrared filter panels 24 rests on acrylic panel 22. The floor and inside walls of enclosure 14 are typically painted white to diffuse radiation from lamps 16a and 16b.

As discussed in the background section above, mask 26 is typically created for each production unit. The intensity distribution across target surface 12 is determined and opaque mask 26 is fabricated and laid in the appropriate place on and oriented properly with respect to filter array 24 to render uniform (e.g., within two percent or less) the intensity of light at the target surface. This procedure, wherein a different mask may be required for each production unit, adds to the expense associated with solar simulator production. Moreover, it may be the case that over time a new or modified mask may be required for each solar simulator.

In the invention, a mask is not typically needed. In one preferred embodiment, a solar simulator, FIGS. 4-5 includes target surface 12 and enclosure 14 with new source fixtures 42a and 42b therein typically spaced close to floor 44 and a half a meter or so from target surface 12. Within each source fixture is a lamp 16a, 16b, typically a 2 meter long xenon tube.

Figure 4:
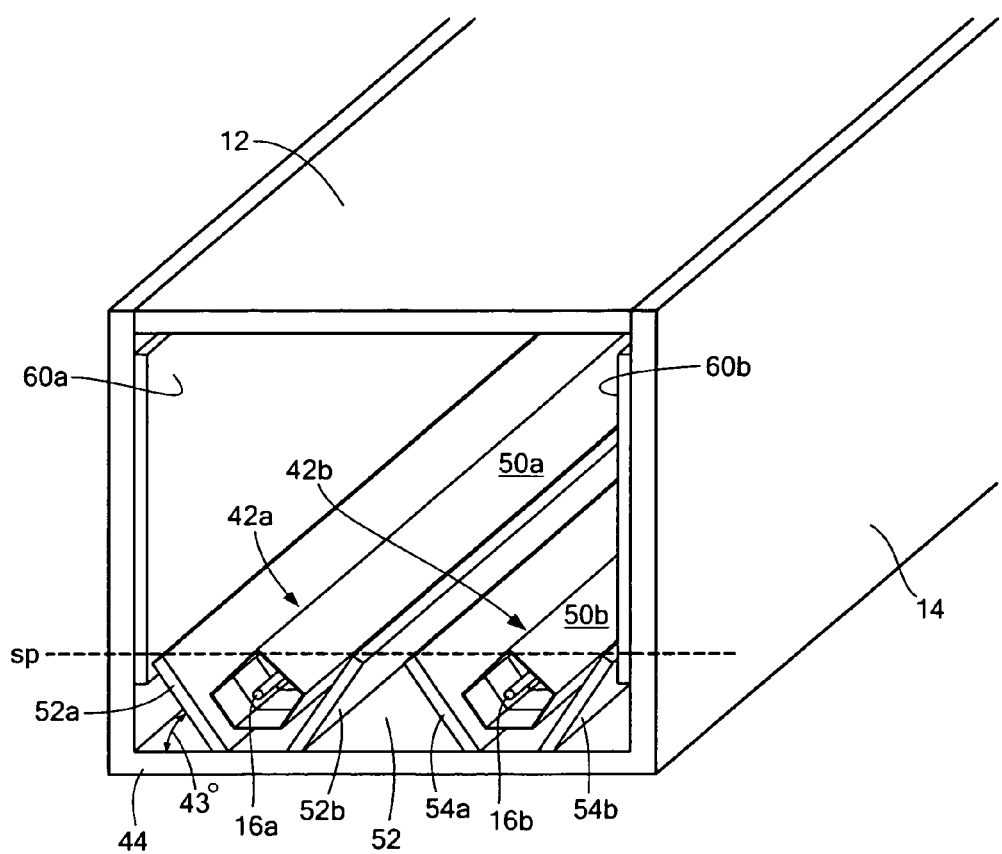
FIG. 4 is a three dimensional schematic end view of an example of a new solar simulator in accordance with the invention with one end panel removed showing the primary structures associated with the new simulator.

There are diffusing surfaces about fixtures 42a and 42b for diffusing radiation emitted by lamps 16a and 16b. Preferably, the fixtures define a source plane SP as shown in FIG. 4 and all reflecting surfaces behind it are diffusing. Examples include covers 50a and 50b for the fixtures (painted white inside and out), floor surface 52, and outwardly angled walls 52a and 52b on opposite sides of and coextensive with fixture 42a and outwardly angled walls 54a and 54b on opposite sides of and coextensive with fixture 42b. These angled walls are positioned and oriented to reflect lamp radiation towards surface 12.

The preferred system also includes specular reflectors positioned to steer the diffused radiation to target surface 12 and oriented to create a uniform intensity distribution across target surface 12. Preferably, these specular reflectors are between the source plane SP and target surface 12. In the example discussed so far, mirrors 60a and 60b, FIG. 5 are provided above diffusing walls 52a, 52b, 54a, 54b and inside and closely adjacent to or on the side walls of the enclosure and mirrors 60c and 60d are provided inside and adjacent to or on the end walls of the enclosure.

Figure 5:
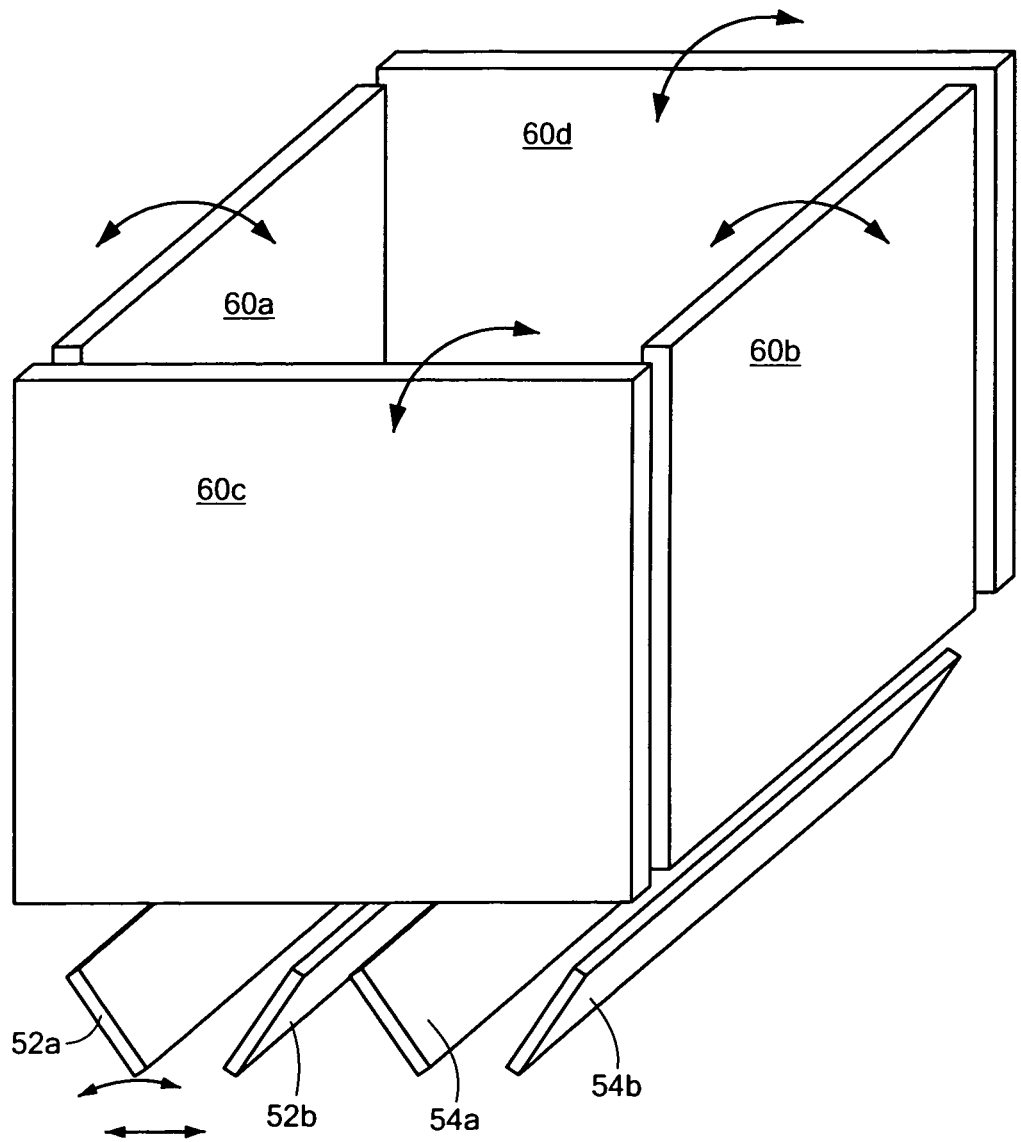
FIG. 5 is a highly schematic view showing the four mirrors of the solar simulator of FIG. 4.

The mirrors can be adjusted and angled via various mounts, for example, with respect to the walls as shown in FIG. 5 to adjust the intensity distribution of the radiation striking the target surface. Mirror mounting options like a tilt mirror may be used. Also, the angles of the diffusing walls (52, 54) and their position relative to each other and the fixtures can also be adjusted to tune the intensity distribution of radiation striking target surface 12. Typical angles for the mirrors are +/-5° from vertical. Diffusing walls 52, 54 are typically oriented at 43° from horizontal. Since the walls 52, 54 are typically coextensive with lamp 16, the walls are typically approximately 2 meters long. For simulator enclosures of different sizes, these dimensions may vary.

Figure 6:
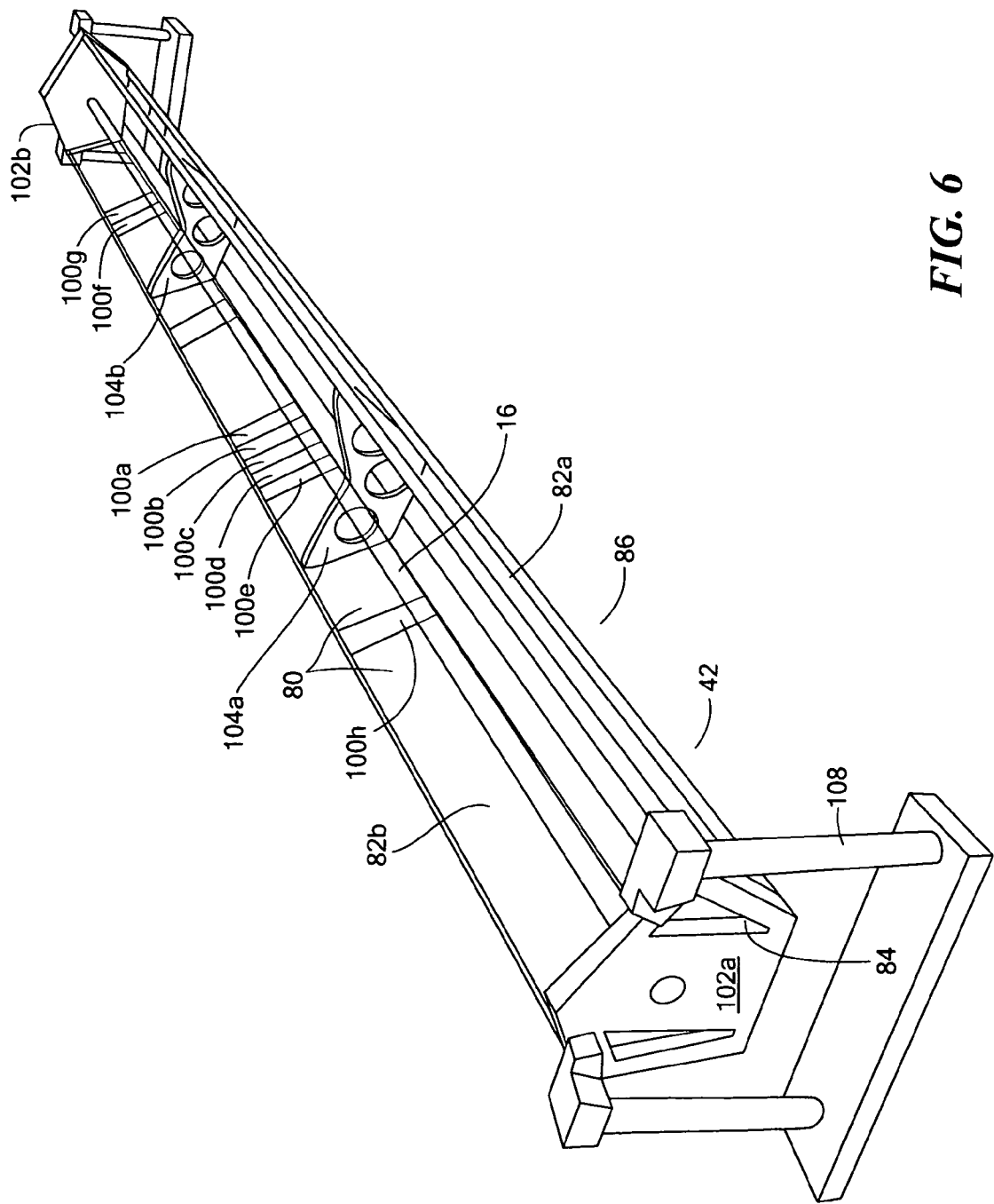
FIG. 6 is a schematic three dimensional top view showing one example of a source fixture in accordance with the invention.
Figure 7:
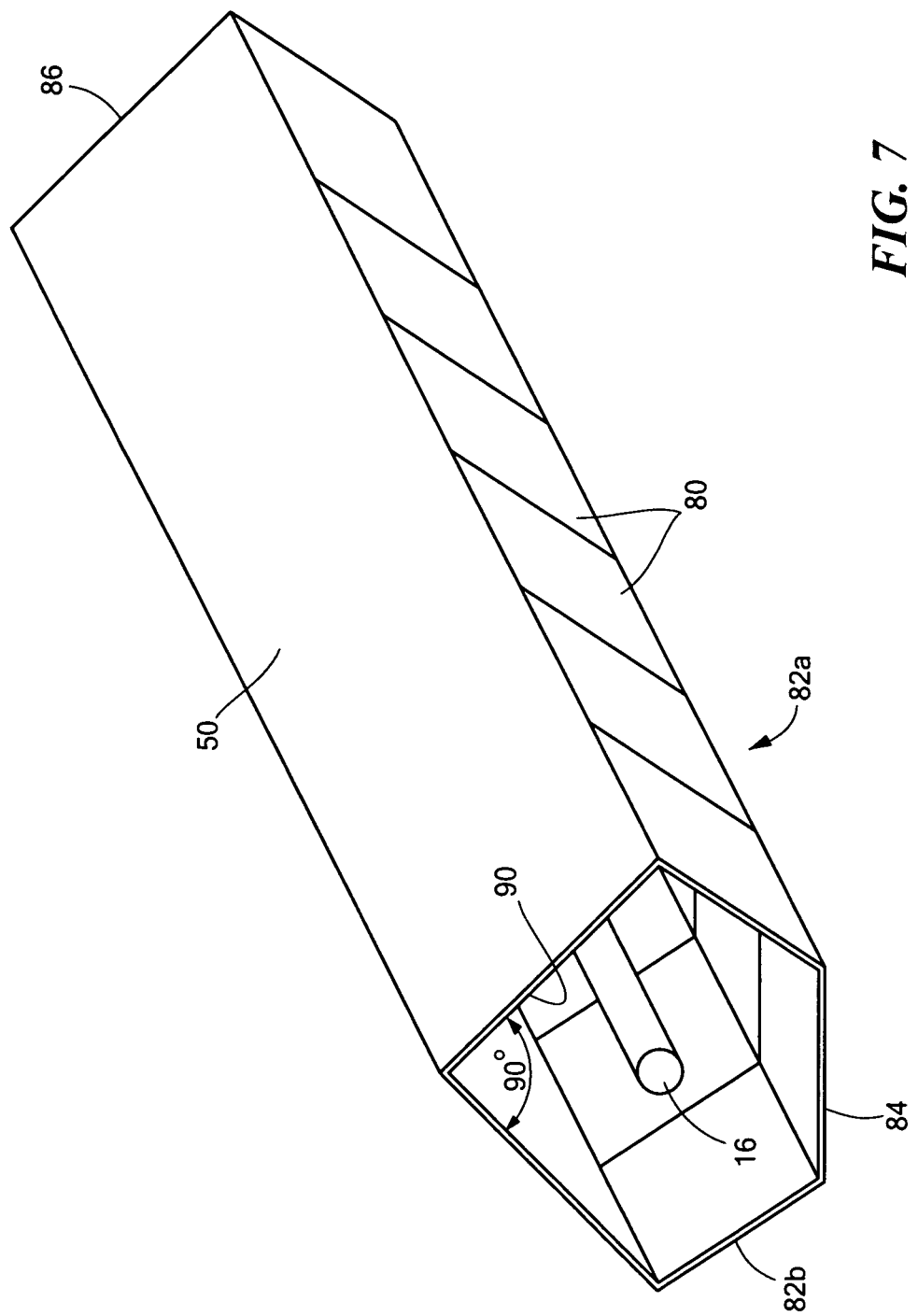
FIG. 7 is a highly schematic conceptual view showing the primary components of the fixture of FIG. 6.

In one design, each source fixture 42, FIGS. 6-7 (there may be only one source fixture in smaller simulators) includes filter plates 80 making up the majority of side walls 82a, 82b and floor 84 of chamber 86 surrounding lamp 16. Cover 50, see FIG. 7, includes diffusing surfaces 90 facing lamp 16 and typically outside diffusing (white) surfaces as well. By placing the infrared filters (and/or any other desired filters) closely adjacent lamp 16, less filters are required. Also, acrylic substrate 22, FIGS. 2 and 3 is no longer required. This reduces the cost of the simulator. In one example, there was a 75% reduction in the total surface area of filter plates required.

As shown in FIG. 6, five mirrors 100a-100e are placed on side wall 82b in this specific example near its middle, two mirrors 100f and 100g are placed as shown to the right and one mirror 100h is placed as shown to the left to address longitudinal non-uniform intensities of lamp 16. Each mirror has a reflective inner surface and a diffusing outer surface. The number, size, and position of the mirrors or other blocking elements will depend on the type and design of lamp 16. Other components of the source fixture also shown in FIG. 6 include end walls 102a and 102b, spacers 104a, 104b, and support structure 108. In other designs, the source fixture is simpler in design and the filter panels as shown in FIGS. 2-3 (e.g., on an acrylic sheet at or above the source plane) are used but, the masking is not usually required since the intensity distribution at the target plane is addressed via other mechanisms.

It is preferred to use diffusing rather than specular optics behind the source plane and also preferred to use specular rather than diffusing optics between the source plane and the target plane. Blocking or obscuring elements or baffles are typically not needed and obscuring elements such as a mask between the source plane and the target are minimized or eliminated. The clustering of the spectrum altering elements or filters as shown in FIGS. 6 and 7 close to the lamp reduces the quantity of these expensive elements and their total surface area.

In the manufacture of a solar simulator in accordance with examples of the invention, the source fixtures are placed near the floor of a simulator enclosure. The angled diffusing walls are positioned on each side of the source fixtures and oriented to control the intensity distribution of radiation emitted by the source fixture at the target surface. The mirrors are positioned and angled to steer diffused radiation towards the target surface and to render more uniform the intensity distribution of radiation at the target surface. The filter elements can be provided at the fixture or otherwise between the lamp and the target surface. The figures hereof depict a compact solar simulator as manufactured. In use, its orientation may be different than that shown in the figures. In the design of FIGS. 2 and 3, the light from the source was diffused and then filtered and then some of this light was blocked by the mask.

In the design of FIGS. 4-7, in contrast, the light is filtered, diffused, and then reflected towards the target surface without any (or with minimal) masking. The result is an increased intensity at the test plane and a less costly manufacturing method and also a solar simulator which is less expensive to produce.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the design of FIG. 5 could be turned on its side or even upside down.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A solar simulator comprising:
a target surface for a solar module;
an enclosure behind the target surface;
at least one source fixture including a lamp in the enclosure spaced from the target surface;
diffusing surfaces about the source fixture for diffusing radiation emitted by the lamp; and
specular reflectors positioned to steer the diffused radiation to the target surface and oriented to create a uniform intensity distribution across the target surface.

2. The simulator of claim 1 in which the lamp includes a xenon tube.

3. The simulator of claim 1 in which there are two spaced source fixtures.

4. The simulator of claim 1 in which one said diffusing surface is a fixture cover over the lamp between the lamp and the target surface.

5. The simulator of claim 1 in which the diffusing surfaces include a diffusing outwardly angled wall on each side of the source fixture positioned to reflect lamp radiation towards the target surface.

6. The simulator of claim 1 in which the specular reflectors include mirrors on each inside wall of the enclosure.

7. The simulator of claim 6 in which each mirror is disposed at an angle with respect to its respective wall to create a uniform intensity distribution across the target surface.

8. The simulator of claim 1 in which the diffusing surfaces include a diffusing outwardly angled wall on each side of the source fixture positioned to reflect lamp radiation towards the target surface and the specular reflectors include mirrors on each inside wall of the enclosure above the diffusing outwardly angled walls.

9. The simulator of claim 1 in which the source fixture includes a chamber for the lamp with walls including filter material.

10. The simulator of claim 9 in which the cover of the chamber includes a diffusing surface facing the lamp.

11. The simulator of claim 9 in which the fixture includes blocking portions positioned to address longitudinal non-uniform intensities of the lamp.

12. The simulator of claim 11 in which said blocking portions include elements mirrored on the inside and diffuse on the outside.

13. The simulator of claim 1 further including filters in the enclosure between the target surface and the source fixture.

14. The simulator of claim 1 in which the lamp is a tube longer than the distance between the tube and the target surface.

15. The simulator of claim 1 in which the source fixture defines a source plane in the enclosure.

16. The simulator of claim 1 in which the diffusing surfaces are positioned behind the source plane.

17. The simulator of claim 16 in which the specular reflectors are between the source plane and the target surface.

18. A solar simulator comprising:
a target surface for a solar module;
an enclosure behind the target surface;
at least one source fixture including a tube lamp in the enclosure spaced from the target surface;
the source fixture including a diffusing cover for the tube lamp;
a diffusing outwardly angled wall on each side of and coextensive with or nearly coextensive with the source fixture and configured to reflect lamp radiation towards the target surface; and
mirrors on each inside wall of the enclosure above the source fixture and angled to create a uniform intensity distribution across the target surface.

19. The simulator of claim 18 in which the tube lamp is a xenon lamp.

20. The simulator of claim 18 in which there are two spaced source fixtures.

21. The simulator of claim 18 in which the source fixture includes a chamber for the lamp with walls including filter material.

22. The simulator of claim 21 in which the cover of the chamber includes a diffusing surface facing the lamp.

23. The simulator of claim 21 in which the fixture includes blocking portions positioned to address longitudinal non-uniform intensities of the lamp.

24. The simulator of claim 23 in which said blocking portions include elements mirrored on the inside and diffuse on the outside.

25. The simulator of claim 18 further including filters in the enclosure between the target surface and the source fixture.

26. The simulator of claim 18 in which the lamp is a tube longer than the distance between the tube and the target surface.

27. The simulator of claim 18 in which the source fixture defines a source plane in the enclosure.

28. The simulator of claim 27 in which the diffusing walls are positioned behind the source plane.

29. The simulator of claim 18 in which the mirrors are between the source plane and the target surface.

30. A method of manufacturing a solar simulator, the method comprising:
positioning a source fixture including a lamp near the floor of a simulator enclosure beneath its target surface;
positioning an outwardly angled diffusing wall on each side of the source fixture to control the intensity distribution of radiation emitted by the source fixture at the target surface;

positioning specular reflectors above the source fixture to steer diffused radiation towards the target surface; and angling the specular reflectors to render uniform the intensity distribution of radiation emitted by the source lamp at the target surface.

31. The method of claim 30 further including the step of adding filter elements between the lamp and the target surface.

32. The method of claim 31 in which the filter elements are fabricated as a part of the fixture.

33. The method of claim 31 in which the filter elements span the enclosure above the source fixture.

34. The method of claim 30 further including selectively blocking radiation from the lamp to render uniform its intensity distribution.

* * * * *